United States Patent
Walsh et al.

(10) Patent No.: US 8,312,487 B1
(45) Date of Patent: Nov. 13, 2012

(54) METHOD AND SYSTEM FOR ARRANGING AN ADVERTISING SCHEDULE

(75) Inventors: Richard J. Walsh, Raleigh, NC (US); Gregory M. Evans, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 661 days.

(21) Appl. No.: 12/347,192

(22) Filed: Dec. 31, 2008

(51) Int. Cl.
*H04N 7/173* (2011.01)
*H04N 7/16* (2011.01)
*H04N 5/445* (2011.01)
*G06F 3/00* (2006.01)

(52) U.S. Cl. ............... 725/34; 725/36; 725/46; 725/97; 725/101

(58) Field of Classification Search .................... 725/34, 725/35, 46, 36, 97, 101
See application file for complete search history.

(56) References Cited

U.S. PATENT DOCUMENTS

| | | | |
|---|---|---|---|
| 4,814,883 A * | 3/1989 | Perine et al. | 725/36 |
| 5,155,591 A | 10/1992 | Wachob | |
| 5,231,494 A | 7/1993 | Wachob | |
| 5,424,770 A | 6/1995 | Schmelzer et al. | |
| 5,652,615 A | 7/1997 | Bryant et al. | |
| 5,959,623 A | 9/1999 | van Hoff et al. | |
| 5,974,398 A | 10/1999 | Hanson et al. | |
| 6,065,050 A | 5/2000 | DeMoney | |
| 6,574,793 B1 | 6/2003 | Ngo et al. | |
| 6,651,089 B1 | 11/2003 | Stead | |
| 6,698,020 B1 | 2/2004 | Zigmond et al. | |
| 6,718,551 B1 | 4/2004 | Swix et al. | |
| 6,738,978 B1 | 5/2004 | Hendricks et al. | |
| 6,799,326 B2 | 9/2004 | Boylan, III et al. | |
| 6,820,277 B1 | 11/2004 | Eldering et al. | |
| 6,938,268 B1 | 8/2005 | Hodge | |
| 6,983,478 B1 * | 1/2006 | Grauch et al. | 725/13 |
| 7,020,892 B2 | 3/2006 | Levesque et al. | |
| 7,100,183 B2 | 8/2006 | Kunkel et al. | |
| 7,134,132 B1 | 11/2006 | Ngo et al. | |
| 7,146,627 B1 | 12/2006 | Ismail et al. | |
| 7,228,555 B2 | 6/2007 | Schlack | |
| 7,245,614 B1 | 7/2007 | Podar et al. | |

(Continued)

FOREIGN PATENT DOCUMENTS

EP 0 989 722 A1 3/2000

(Continued)

OTHER PUBLICATIONS

No Author, Advertisement Bidding System and Method, (website), obtained Jun. 15, 2007, 2 pages, http://www.priorartdatabase.com/IPCOM/000138556.

(Continued)

*Primary Examiner* — Pankaj Kumar
*Assistant Examiner* — Reuben M Brown
(74) *Attorney, Agent, or Firm* — Withrow & Terranova, PLLC

(57) ABSTRACT

A method and system for arranging advertising breaks based on channel surfing characteristics of viewers. The surfing characteristics of a plurality of viewers is determined, the surfing characteristics bearing on a likelihood of a respective viewer channel surfing. Advertisements are assigned to time slots among a plurality of channels based on the surfing characteristics of the plurality of viewers to form an advertising schedule. Programming is delivered with the plurality of advertisements according to the advertising schedule. The reduction of simultaneous channel surfing increases availability and efficient use of a shared medium by a plurality of different users.

16 Claims, 10 Drawing Sheets

U.S. PATENT DOCUMENTS

| | | | |
|---|---|---|---|
| 7,363,643 B2 | 4/2008 | Drake et al. | |
| 7,882,531 B2 | 2/2011 | Yamagishi | |
| 2002/0019769 A1 | 2/2002 | Barritz et al. | |
| 2002/0078444 A1 | 6/2002 | Krewin et al. | |
| 2002/0087402 A1 | 7/2002 | Zustak et al. | |
| 2002/0087978 A1 | 7/2002 | Nicholson et al. | |
| 2002/0095454 A1 | 7/2002 | Reed et al. | |
| 2002/0124249 A1 | 9/2002 | Shintani et al. | |
| 2002/0124251 A1 | 9/2002 | Hunter et al. | |
| 2002/0138291 A1 | 9/2002 | Vaidyanathan et al. | |
| 2002/0138440 A1 | 9/2002 | Vaidyanathan et al. | |
| 2002/0144263 A1* | 10/2002 | Eldering et al. | 725/34 |
| 2002/0161838 A1 | 10/2002 | Pickover et al. | |
| 2002/0184403 A1 | 12/2002 | Dahlin et al. | |
| 2003/0004793 A1 | 1/2003 | Feuer et al. | |
| 2003/0028888 A1 | 2/2003 | Hunter et al. | |
| 2003/0061607 A1 | 3/2003 | Hunter et al. | |
| 2003/0065804 A1 | 4/2003 | Owerfeldt et al. | |
| 2003/0145323 A1* | 7/2003 | Hendricks et al. | 725/34 |
| 2003/0149975 A1 | 8/2003 | Eldering et al. | |
| 2004/0032881 A1 | 2/2004 | Arai | |
| 2004/0034863 A1 | 2/2004 | Barrett et al. | |
| 2004/0049600 A1 | 3/2004 | Boyd et al. | |
| 2004/0111742 A1 | 6/2004 | Hendricks et al. | |
| 2004/0163101 A1* | 8/2004 | Swix et al. | 725/9 |
| 2004/0225719 A1 | 11/2004 | Kisley et al. | |
| 2005/0039205 A1 | 2/2005 | Riedl | |
| 2005/0091160 A1 | 4/2005 | Kitze et al. | |
| 2005/0097183 A1 | 5/2005 | Westrelin | |
| 2005/0108776 A1 | 5/2005 | Carver et al. | |
| 2005/0240967 A1 | 10/2005 | Anderson et al. | |
| 2005/0251820 A1 | 11/2005 | Stefanik et al. | |
| 2006/0036490 A1 | 2/2006 | Sagalyn | |
| 2006/0059042 A1 | 3/2006 | Zohar | |
| 2006/0075057 A1 | 4/2006 | Gildea et al. | |
| 2006/0095507 A1 | 5/2006 | Watson | |
| 2006/0107302 A1 | 5/2006 | Zdepski | |
| 2006/0110552 A1 | 5/2006 | Ishida et al. | |
| 2006/0123443 A1 | 6/2006 | Hamilton et al. | |
| 2006/0168616 A1 | 7/2006 | Candelore | |
| 2006/0212900 A1 | 9/2006 | Ismail et al. | |
| 2006/0294555 A1 | 12/2006 | Xie | |
| 2007/0027755 A1 | 2/2007 | Lee | |
| 2007/0028261 A1 | 2/2007 | Bouilloux-Lafont | |
| 2007/0058670 A1 | 3/2007 | Konduru et al. | |
| 2007/0089127 A1* | 4/2007 | Flickinger et al. | 725/32 |
| 2007/0107026 A1 | 5/2007 | Sherer et al. | |
| 2008/0127245 A1 | 5/2008 | Olds | |
| 2009/0049469 A1* | 2/2009 | Small et al. | 725/35 |
| 2009/0077598 A1* | 3/2009 | Watson et al. | 725/93 |
| 2009/0133053 A1* | 5/2009 | Badt et al. | 725/32 |
| 2010/0058393 A1* | 3/2010 | Bontempi | 725/58 |

FOREIGN PATENT DOCUMENTS

| | | | |
|---|---|---|---|
| EP | 1 067 792 A2 | | 1/2001 |
| EP | 1 071 287 A2 * | | 1/2001 |
| EP | 1 162 840 A2 | | 12/2001 |
| EP | 1 418 514 A1 | | 5/2004 |
| EP | 1 524 602 A2 | | 4/2005 |
| EP | 1 528 478 A1 | | 5/2005 |
| WO | WO 99/05584 A2 | | 2/1999 |
| WO | WO 99/52285 A1 | | 10/1999 |
| WO | WO 00/14951 A1 | | 3/2000 |
| WO | WO 01/47153 A2 | | 6/2001 |
| WO | WO 01/71524 A1 | | 9/2001 |
| WO | WO 02/19581 A1 | | 3/2002 |
| WO | WO 02/45430 A2 | | 6/2002 |
| WO | WO 02/054754 A2 | | 7/2002 |
| WO | WO 03/053056 A1 | | 6/2003 |

OTHER PUBLICATIONS

S. Bailey et al., "The Architecture of Direct Data Placement (DDP) and Remote Direct Memory Access (RDMA) on Internet Protocols", (article), Dec. 2005, 21 pages, Internet informational RFC 4296, http://www.ietf.org/rfc/rfc4296.txt.

No Author, CableLabs, PacketCable TM 2.0, "Codec and Media Specification, PKT_AP_CODEC_MEDIA_I02-061013", (document), Oct. 13, 2006, 89 pages, http://www.packetcable.com/downloads/specs/PKT-SP-CODEC-MEDIA-I02-061013.pdf.

B. Cain et al., "Internet Group Management Protocol, Version 3", (article), Oct. 2002, 50 pages, Internet informational RFC 3376, http://www.ietf.org/rfc/rfc3376.txt.

No Author, "Internet Protocol: DARPA Internet Program Protocol Specification", (article), Sep. 1981, 49 pages, Internet informational RFC 791, http://www.ietf.org/rfc/rfc791.txt.

S. Deering et al., "Internet Protocol, Version 6 (IPv6) Specification", (article), Dec. 1998, 37 pages, Internet information RFC 2460, http://www.ietf.org/rfc/rfc2460.txt.

James Gwertzman et al., "An Analysis of Geographical Push-Caching," (article), May 1995, pp. 51-55, in Proceedings of the 5th IEEE Workshop on Hot Topics in Operating Systems, Orcas Island, WA.

Jeff Hilland et al., "RDMA Protocol Verbs Specification (Version 1.0)", (article), Apr. 2003, 242 pages, http://www.rdmaconsortium.org/home/draft-hilland-iwarp-verbs-v1.0-RDMAC.pdf.

No Author, Internet Cache Protocol, (website), obtained Jun. 15, 2007, 2 pages, http://en.wikipedia.org/wiki/Internet_Cache_Protocol.

No Author, ITU Publications: Welcome, (website), obtained Jun. 26, 2008, 1 page, http://www.itu.int/publications/.

J. Postel, "User Datagram Protocol", (article), Aug. 28, 1980, 3 pages, Internet informational RFC 768, http://www.ietf.org/rfc/rfc768.txt.

R. Recio et al., "A Remote Direct Memory Access Protocol Specification," (article), Sep. 8, 2006, 60 pages, Internet Draft, http://www.ietf.org/internet-drafts/draft-ietf-rddp-rdmap-07.txt.

R. Recio et al., "An RDMA Protocol Specification (Version 1.0)", (article), Oct. 2002, 82 pages, http://www.rdmaconsortium.org/home/draft-recio-iwarp-rdmap-v1.0.pdf.

A. Romanow et al., "Remote Direct Memory Access (RDMA) over IP Problem Statement", (article), Dec. 2005, 19 pages, Internet informational RFC 4297, http://www.ietf.org/rfc/rfc4297.txt.

H. Schulzrinne et al., "Real Time Streaming Protocol (RTSP)", (article), Apr. 1998, 86 pages, Internet informational RFC 2326, http://www.ietf.org/rfc/rfc2326.txt.

H. Schulzrinne et al., "RTP: ATransport Protocol for Real-Time Applications", (article), Jul. 2003, 98 pages, Internet informational RFC 3550, http://www.ietf.org/rfc/rfc3550.txt.

Hemel Shah et al., "Direct Data Placement over Reliable Transports (Version 1.0)", (article), Oct. 2002, 35 pages, http://www.rdmaconsortium.org/home/draft-shah-iwarp-ddp-v1.0.pdf.

No Author, SnapStream:PC DVR and TV tuner software, (website), obtained Jun. 15, 2007, 1 page, http://www.snapstream.com.

No Author, Squid Cache, (website), obtained Jun. 15, 2007, 3 pages, http://en.wikipedia.org/wiki/Squid_cache.

S. Wenger et al., "RTP Payload Format for H.264 Video", (article), Feb. 2005, 65 pages, Internet informational RFC 3984, http://www.ietf.org/rfc/rfc3984.txt.

No Author, Screen Plays Information Marketplace, (website), obtained Feb. 4, 2009, 1 page, http://www.screenplaysmag.com/.

No Author, Hybrid fibre-coakia—Wikipedia, (website), obtained Aug. 21, 2008, 3 pages, http://en.wikipedia.org/w/index.php?title=Hybrid_fibre-coaxial&printable=yes.

Jonathan Strickland, "How Switched Digital Video Works," (article), obtained Aug. 21, 2008, 4 pages, http://electronics.howstuffworks.com/switched-digital-video.htm/printable.

Luis Rovira, "Switched Digital Video," (article), Feb. 1, 2006, 7 pages, http://www.cable360.net/print/ct/strategy/emergingtech/14909.html.

Tom Kennedy, "Cable-Style IPTV," (article), Nov. 1, 2007, 4 pages, http://www.cable360.net/print/technology/emergingtech/26400.html.

Michael Eagles et al., "The Cost of Fair Bandwidth: Business Case on the Rise of Online Video, P2P, and Over-the-Top; Proactive Steps Operators can Take Today to Meet Bandwidth Demands in the New Future," (article), date unknown, 14 pages.

* cited by examiner

METHOD AND SYSTEM FOR ARRANGING AN ADVERTISING SCHEDULE

FIELD OF THE INVENTION

This invention relates generally to providing programs over a shared medium on an on-demand basis, and in particular to arranging advertisements among the programs based on channel surfing characteristics bearing on a likelihood of a viewer channel surfing.

BACKGROUND OF THE INVENTION

Video services, such as broadcast television and video on demand services, are frequently provided to viewers over a shared medium, such as a hybrid fiber coaxial network. A headend device coupled to the shared medium provides programs in response to viewer requests generated by a user device, such as a set top box, that is similarly coupled to the shared medium. The user device receives the requested program from the headend over the shared medium and provides the program for display to the viewer. Service providers are increasingly adding non-video services, such as telephone services, audio services, and high speed data access services, over the same shared medium used to deliver video services. Because of the finite bandwidth of the shared medium and the large number of users using the shared medium, during peak usage times the shared medium may become loaded to capacity, preventing the headend from fulfilling a requested service to one or more users. The inability to provide a requested service over the shared medium may lead to user dissatisfaction, and may inhibit the service provider from generating additional revenue when the requested service requires payment of an additional fee, such as a video on demand request.

Until relatively recently a headend provided all broadcast television channels over the shared medium irrespective of whether each of the television channels had viewers. Consequently, valuable bandwidth of the shared medium might be consumed by one or more channels that have no viewers. With the advent of newer technologies, such as switched digital video, a headend can selectively provide channels over the shared medium depending on whether there are viewers of the respective channels. Channels that have no viewers will not be provided over the shared medium, and consequently will not consume bandwidth of the shared medium. This ability to selectively provide broadcast programming on an as-requested basis frees bandwidth of the shared medium for other services.

When a viewer requests a channel change in a switched digital video system, a channel change request is generated by the user device and is communicated from the user device to the headend, which determines whether or not the requested channel is already being provided over the shared medium. If so, the headend can merely provide the frequency of the requested channel to the user device, which can then tune to that frequency to obtain the requested channel. If the requested channel is not currently being provided over the shared medium, the headend will ensure sufficient bandwidth exists on the shared medium and, if so, will determine an appropriate frequency on which to provide the requested channel, begin streaming the requested channel over the shared medium, and provide the frequency to the user device. While any viewer may randomly change the channel during a program in a relatively unpredictable manner, it is especially common for viewers to change channels, referred to herein as channel surfing, during the display of advertisements. Consequently, when a popular program with a high viewership begins an advertising break, a switched digital video system may be required to rapidly provide a relatively high number of new channels over the shared medium in a relatively short period of time to satisfy the channel change requests of the viewers, which can quickly consume the bandwidth of the shared medium. As the bandwidth of the shared medium reaches capacity, video on demand requests may not be able to be fulfilled, and bandwidth allocated to data services may be reduced, slowing down Internet access and data downloads.

Channel surfing behavior follows certain patterns based on viewer habits, program content, and many other factors. Certain viewers are habitual channel surfers and move from channel to channel at the first instance of an advertising break. Other viewers channel surf based on an interest level of the program they were viewing immediately prior to the advertising break. Viewers may be less likely to channel surf from a high interest program for fear of missing a portion of the program should they not return to the program prior to the end of the advertising break, but the same viewers may not hesitate to channel surf from a low interest program because they hope not to return to the original program if they can find other programming that interests them more. Moreover, the effect of channel surfing on the shared medium differs based on whether the destination channel is already being provided over the shared medium or whether the destination channel must be provided in response to the request, which requires allocation of additional bandwidth. Because viewers are more likely to channel surf during an advertising break, it would be advantageous if a service provider could allocate advertisements among channels based on surfing behavior of the viewers in a manner that would minimize channel surfing during advertising breaks.

SUMMARY OF THE INVENTION

The present invention relates to arranging advertisements among channels being provided over a shared medium based on surfing characteristics of viewers. The surfing characteristics are determined by analyzing data relating to channel changes requested by the viewers over a period of time. By arranging advertisements based on surfing characteristics that bear on a likelihood of a viewer channel surfing, the present invention can reduce nearly simultaneous channel surfing by ensuring that an advertisement scheduled on one channel that surfing characteristics indicate will have a high number of channel surfers will not be scheduled at the same time on another channel that surfing characteristics indicate will also have a high number of channel surfers. Reducing nearly simultaneous channel surfing reduces the demand for bandwidth of the shared medium.

According to another embodiment of the invention, advertisements are arranged such that a low viewership program is on an advertising break while a high viewership program is not on an advertising break, increasing a likelihood that a viewer channel surfing from a low viewership program to a high viewership program will remain on the high viewership program because the high viewership program is not showing advertising at the time of the channel change. If all viewers of a low viewership program channel surf to other channels and remain on such channels for a period of time, a data stream carrying the low viewership program can be terminated, freeing up bandwidth of the shared medium.

According to one embodiment of the invention, a device, such as a headend, obtains channel surfing information associated with viewers, such as channel change requests and related information such as the original channel being viewed prior to the channel change request, the destination channel being requested, the time of the channel change request, the program being played on the original channel, and the program being played on the destination channel. Surfing characteristics bearing on a likelihood of a respective viewer channel surfing are determined from the channel surfing information. Channel schedules based on permissible advertising time slots for each of a plurality of channels are determined. Each channel may have a number of permissible advertising time slots, and thus a number of channel schedules may be determined for each channel. Some channels, such as channels showing live sporting events, may be excluded from the channel schedule determination. A plurality of composite schedules based on the potential channel schedules is generated. Each composite schedule is scored based on the channel surfing characteristics of predicted viewers. The composite schedule having the best score is selected, and programming is provided with the advertisements according to the selected schedule.

According to another embodiment of the invention, channel destination characteristics bearing on a likelihood of a viewer channel surfing to a particular channel are determined. Advertisements are arranged such that likely destination channels are not on an advertising break at the same time as those channels viewers are predicted to be watching are on an advertising break. Viewers that channel surf to the predicted destination channel will be presented programming rather than advertising, increasing a likelihood that the viewers will forego additional channel surfing.

According to another embodiment of the invention, a high viewership channel is duplicated, or replicated, such that two channels carry the same programming over the shared medium. A number of user devices tuned to the original channel are requested to tune to the replicated channel. This may be transparent to the viewers of such user devices. Replicating the original channel into two channels enables a composite schedule to be generated that ensures advertising time slots on the original channel differ from advertising time slots on the replicated channel, reducing the number of simultaneous channel surfers that would otherwise exist if such viewers went on an advertising break simultaneously.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
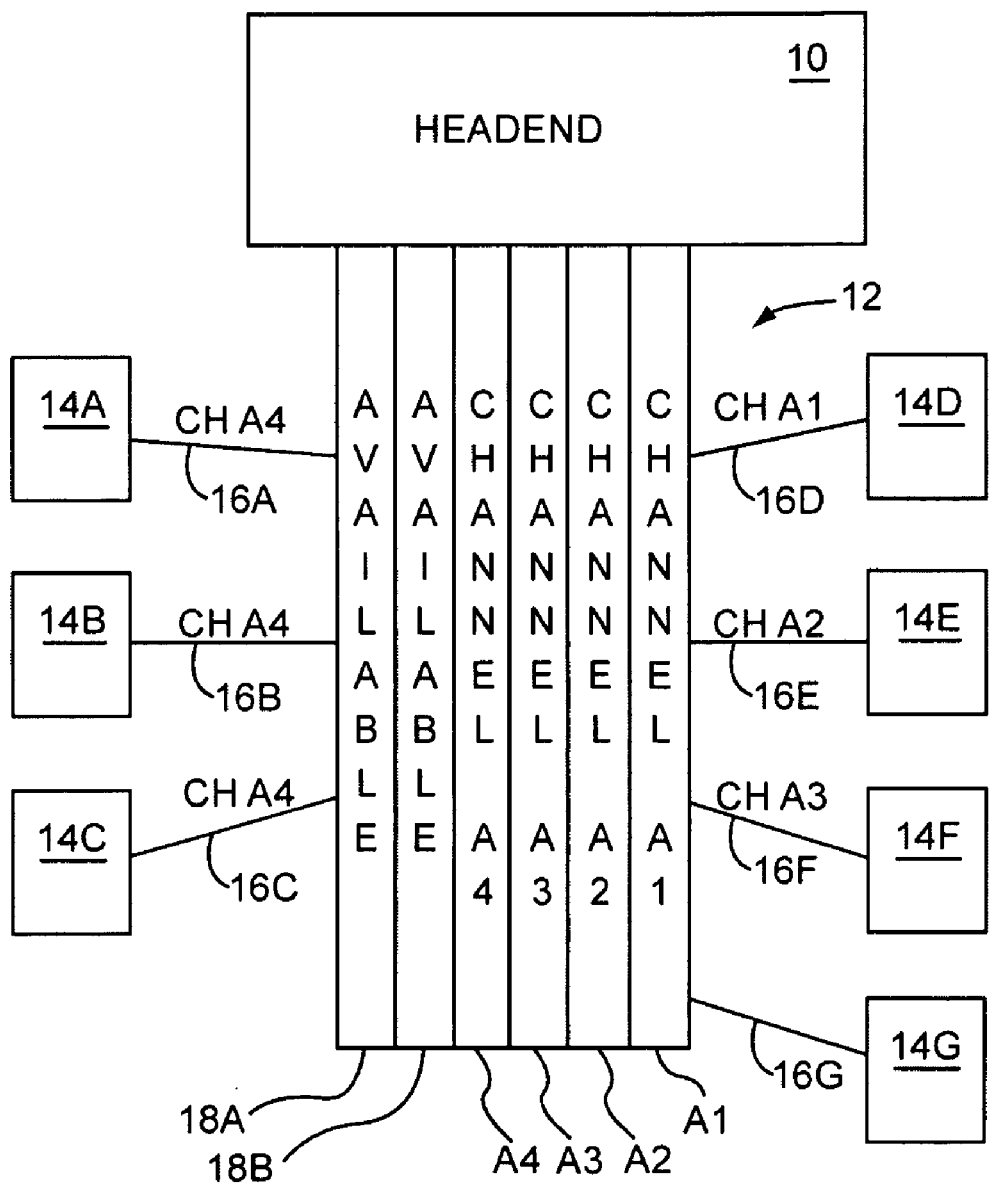
FIG. 1 is a diagram of a cable infrastructure suitable for implementing aspects of the present invention in the context of a service provider according to one embodiment of the present invention.

FIG. 1 is a diagram of a cable infrastructure suitable for implementing aspects of the present invention in the context of a service provider, such as a multiple system operator (MSO), providing broadcast and video on demand services to a plurality of users. A headend 10 provides programming services over a shared medium 12 to a plurality of user devices 14A-14G. The user devices 14A-14G are coupled to the shared medium 12 via local links 16A-16G, respectively. For purposes of illustration and clarity, the user devices 14A-14G may be referred to singularly as the user device 14 or collectively as the user devices 14 when the discussion relates to user devices 14 generally rather than a specific user device 14A-14G. Likewise, the local links 16A-16G may be referred to singularly as the local link 16 or collectively as the local links 16 when the discussion relates to a local link 16 generally rather than a specific local link 16A-16G.

The headend 10 can comprise any suitable device or group of devices capable of providing video, data, or other types of services over the shared medium 12 to the user devices 14. One such service is the provision of broadcast programming via one or more channels A1-A4. Each such channel A1-A4 may be viewed by one or more viewers associated with the user devices 14. For example, as shown in FIG. 1, viewers associated with the user devices 14A-14C are viewing channel A4, a viewer associated with the user device 14D is viewing channel A1, a viewer associated with the user device 14E is viewing channel A2, and a viewer associated with the user device 14F is viewing channel A3. Available slots 18A and 18B represent additional bandwidth available on the shared medium 12 that may be used to provide an additional channel or other service, such as video on demand, telephone service, high speed data access, and the like.

The cable infrastructure of a particular cable service provider typically includes a number of headends, and each headend provides feeds to a relatively large number of subscribers. While for purposes of illustration the shared medium 12 is shown as having a relatively simple configuration with connections to a number of user devices 14, it is common for the shared medium 12 to comprise a relatively complex tree and branch hierarchy with multiple splitters and amplifiers to ensure sufficient signal strength to each user device 14, as will be apparent to those skilled in the art.

The user devices 14 can comprise any suitable equipment capable of interacting over a respective local link 16 and the shared medium 12 with the headend 10. The local links 16 can comprise any suitable wired or wireless technology capable of coupling the shared medium 12 with the respective user device 14. For example, the user device 14A may comprise a set top box, and the local link 16A may comprise a coaxial cable. The user device 14B may comprise a personal computer, and the local link 16B may comprise an Ethernet cable coupled to a cable modem that is in turn coupled to the shared medium 12. The user device 14C may comprise a wireless handheld device, and the local link 16C may comprise a wireless technology, such as 802.11 or Bluetooth, that is coupled to a cable modem. The user device 14D may comprise a cellular telephone and the local link 16D may comprise a cellular connection with a cell tower (not shown) that is coupled to the shared medium 12. Each of the user devices 14 typically has an associated display device (not shown). For example, the user device 14A may have a television monitor, the user device 14B may have a liquid crystal display (LCD) computer monitor, and the user devices 14C and 14D have may integrated LCD screens.

The headend 10 may comprise a single piece of equipment or multiple pieces of equipment communicatively coupled together. The headend 10 preferably implements a technology, such as switched digital video or the like, that enables the headend 10 to provide the channels A1-A4 over the shared medium 12 on an as-requested basis. Thus, even though the service provider may offer a viewer access to 150 channels of television, only those channels that have been requested by a user device 14 are being provided over the shared medium 12. The ability to selectively provide a broadcast feed over the shared medium 12 reduces bandwidth utilization of the shared medium 12 and, at peak usage times, enables the service provider to provide more services than would otherwise be available if all broadcast channels were always provided over the shared medium 12 irrespective of whether each channel was actually being viewed by at least one viewer.

When a viewer requests a channel change, referred to herein as channel surfing, the respective user device 14 sends information identifying the desired destination channel to the headend 10. If the destination channel is already being provided over the shared medium 12, the headend 10 merely provides the appropriate address or frequency of the requested channel to the user device 14 and the user device 14 tunes to that frequency, receives the channel, and provides the program being carried on the channel for display to the viewer. For example, the viewer associated with the user device 14A may decide to request a channel change from the channel A4 to the channel A1. Using a remote control communicatively coupled to the user device 14A, the viewer indicates a desire to view the channel A1. The user device 14A receives the request and generates and sends a message requesting a channel change to the channel A1 to the headend 10. The headend 10 determines that the channel A1 is already being provided on the shared medium 12, determines the frequency of the channel A1, and provides the frequency to the user device 14A. If the viewer had instead requested a channel change to channel A5 (not shown), the headend 10 would determine that the channel A5 is not being provided over the shared medium 12, determine whether existing bandwidth exists on the shared medium 12 and, if so, select an unused frequency on which the channel A5 can be provided over the shared medium 12. Assume that the headend 10 uses the available slot 18B to provide the channel A5. The headend 10 provides the frequency to the user device 14A and begins providing the requested channel A5 over the shared medium 12 on the selected frequency. The user device 14A tunes to the provided frequency and provides the channel A5 to the viewer.

Assume further that a viewer associated with the user device 14B requests a channel change to channel A6 (not shown). The process described above with respect to the channel A5 is repeated, and the available slot 18A is used to provide the channel A6 over the shared medium 12. Because the viewer associated with the user device 14C continues to view the channel A4, the channel A4 continues to be provided over the shared medium 12. However, note that no additional available slots 18 remain. Assume that a viewer associated with the user device 14G requests a video on demand program. The user device 14G generates and sends a message requesting the video on demand program from the headend 10. The headend 10 determines that no remaining bandwidth is available on the shared medium 12, and indicates to the user device 14G that the video on demand request cannot be fulfilled.

Note that as each viewer requests a channel change, the associated user device 14 generates a message that is sent to the headend 10 identifying the channel change request. According to one embodiment of the invention, channel change request information is retained so that surfing characteristics bearing on a likelihood of a viewer channel surfing can be determined. The channel change information that is retained can include information such as one or more of the original channel being viewed by the viewer prior to the channel change request, the destination channel requested by the channel change request, the identity of the program being provided on the original channel, the identity of the program being provided on the requested destination channel, whether or not the channel change request occurred during an advertising break, the time of the channel change request, and any other suitable information or statistics that may be useful in determining surfing characteristics. The channel change information can be retained by the respective user device 14, by the headend 10, or by other equipment in the service provider's network. Such information may be retained in a privacy compliant manner for use by a respective service provider as discussed herein. The channel change information may be captured by an application maintained in each user device 14 and provided to a central server (not shown) associated with the service provider.

Viewers are generally more likely to request channel changes, or channel surf, during advertising breaks than when programming is being displayed. Many viewers simultaneously channel surfing may cause resource difficulties for the headend 10 due to processing many channel change requests at once, and from having to allocate newly requested channels on the shared medium 12. Consequently, the arrangement of advertising on the channels A1-A4, sometimes referred to herein as an advertising schedule, can impact the amount of simultaneous channel surfing. For example, if the channels A1-A4 each have an advertisement scheduled to be provided to the viewer at 4:22 PM, it is possible that all six of the viewers associated with the user devices 14A-14F may begin to channel surf at 4:22 PM. If each such viewer nearly simultaneously requests a different channel, the headend 10 will have to rapidly process each channel change request, determine whether the requested destination channel is already being provided on the shared medium 12 and, if not, will need to obtain bandwidth on the shared medium 12 to provide the requested destination channel. Note that for any of the viewers that select one of the other channels A1-A4 as the requested destination channel, it is likely that the viewer will issue yet another channel change request as soon as they determine such requested destination channel is also on an advertising break. Now assume that an advertising break is scheduled on the channel A4 for 4:22 PM, an advertising break is scheduled on the channel A1 for 4:18 PM, an advertising break is scheduled on the channel A2 for 4:20 PM, and an advertising break is scheduled for the channel A3 for 4:24 PM. Further assume that each advertising break is two minutes long. At 4:22 PM, viewers associated with the user devices 14A-14C may issue channel change requests, but the viewers associated with the user devices 14D-14F likely will not issue channel change requests at that time because they are not on an advertising break. Further, if any of the viewers associated with the user devices 14A-14C request the channels A1-A3 as a destination channel, there is a likelihood they will continue to view the requested destination channel for at least a period of time to determine whether they enjoy the programming on that respective channel or not.

Figure 2A:
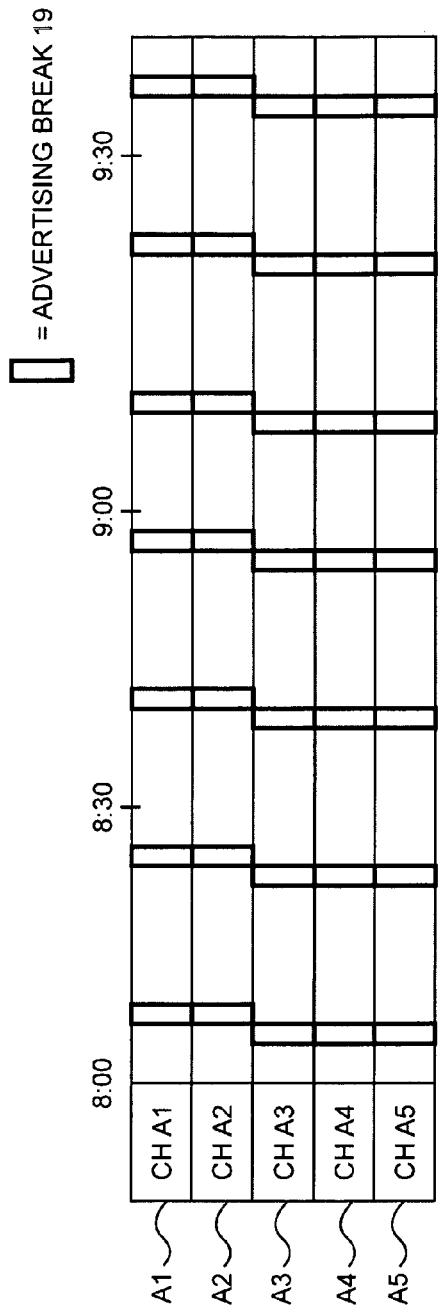
FIGS. 2A and 2B are block diagrams illustrating advertising schedules for a plurality of channels.

FIG. 2A is a block diagram illustrating an advertising schedule for a plurality of channels. The phrases "advertising time slot" and "time slot" will be used herein to refer to a particular time of day allocated for an advertising break 19. The phrase "advertising break" will be used herein to describe the time during which the regular programming being provided on a particular channel is stopped and other material, such as a commercial or other advertisement, is provided. One time slot can differ according to the present invention by any increment of time from another time slot. According to one embodiment of the invention, a time slot may differ from another time slot by as little as one second. Note that the advertising breaks 19 for the channel A1 are at the same time slot as the advertising breaks 19 for the channel A2. Similarly, the advertising breaks 19 for the channels A3-A5 are at the same time slots. Consequently, at approximately 8:05 PM, each of the channels A3-A5 will go to an advertising break 19, potentially resulting in a relatively large number of viewers channel surfing nearly simultaneously.

For information relating to techniques for advertising insertion into digital video streams, please consult Society of Cable Telecommunications Engineers (SCTE) 130-1 2008 entitled "Digital Program Insertion—Advertising Systems Interfaces, Part 1—Advertising Systems Overview (Informative)," SCTE 130-2 2008a entitled "Digital Program Insertion—Advertising Systems Interfaces, Part 2, Core Data Elements," SCTE 130-3 2008a entitled "Digital Program Insertion—Advertising Systems Interfaces, Part 3, Ad Management Service (ADM) Interface," and SCTE 130-4 2008a entitled "Digital Program Insertion—Advertising Systems Interfaces, Part 4, Content Information Service (CIS)," all of which are hereby incorporated herein by reference in their entireties.

Figure 2B:
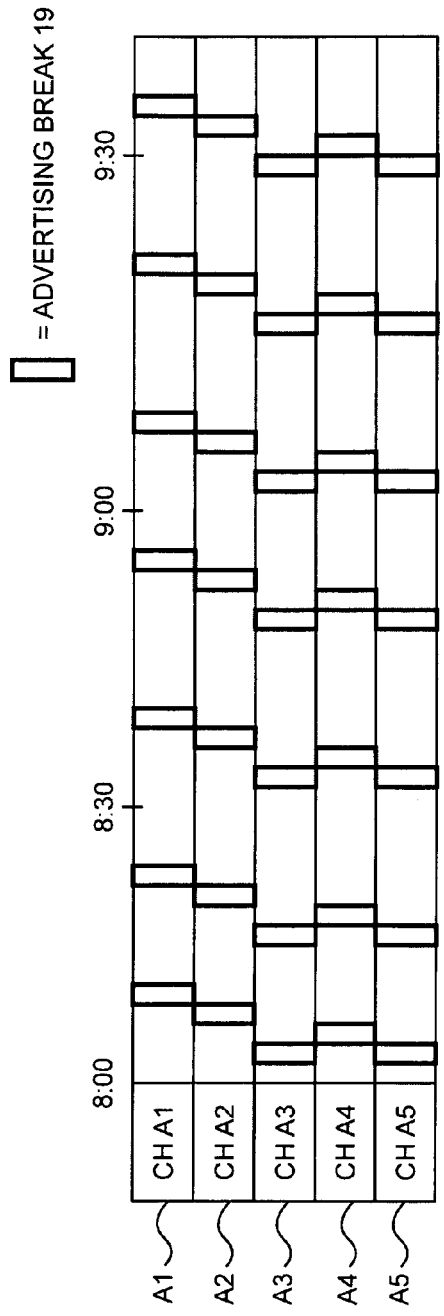

FIG. 2B is a block diagram illustrating another advertising schedule for the plurality of channels shown in FIG. 1. Note that only the advertising breaks 19 associated with the channels A3 and A5 overlap, likely reducing the number of simultaneous channel surfers compared to the advertising schedule illustrated in FIG. 2A. However, further note that without taking into consideration surfing characteristics of the viewers of the channels A1-A5, the advertising schedule illustrated in FIG. 2B may not be a preferable advertising schedule from the perspective of reducing simultaneous channel surfing. For example, assume that surfing characteristics indicate that the programs showing on the channels A3 and A5, respectively, are typically viewed by very active channel surfers, but the programs shown on the channels A2 and A4, respectively, are typically viewed by very light, or less active, channel surfers. In that situation, an advertising schedule that arranges the advertising breaks 19 for the channels A2 and A3 in one time slot and the advertising breaks 19 for the channels A4 and A5 in another time slot would likely result in significantly lower simultaneous channel surfing than the advertising schedule illustrated in FIG. 2B.

According to one embodiment of the present invention, an advertising schedule is generated for a plurality of channels based on surfing characteristics to reduce simultaneous channel surfing. The advertising schedule may be determined for all channels that can be provided over the shared medium 12, or may be determined for only some of the channels that can be provided over the shared medium 12. The channels that are included in the advertising schedule may depend on the time of day covered by the advertising schedule. If it is not possible to determine with certainty the timing of advertising breaks for certain programs, such as live sporting events, channels showing live sporting events may be excluded from the advertising schedule if desired. Other programming, such as an infomercial program, is in essence one long advertising break, and may be excluded from the advertising schedule. According to the present invention, the advertising schedule may be generated at predetermined times, such as every other hour, and cover only the period of time until the next advertising schedule. Alternately, the advertising schedule may be generated in response to a determination that a loading threshold associated with the shared medium 12 has been exceeded. For example, an advertising schedule may be generated if the available bandwidth on the shared medium 12 is less than 20% of the total bandwidth of the shared medium 12.

Figure 3:
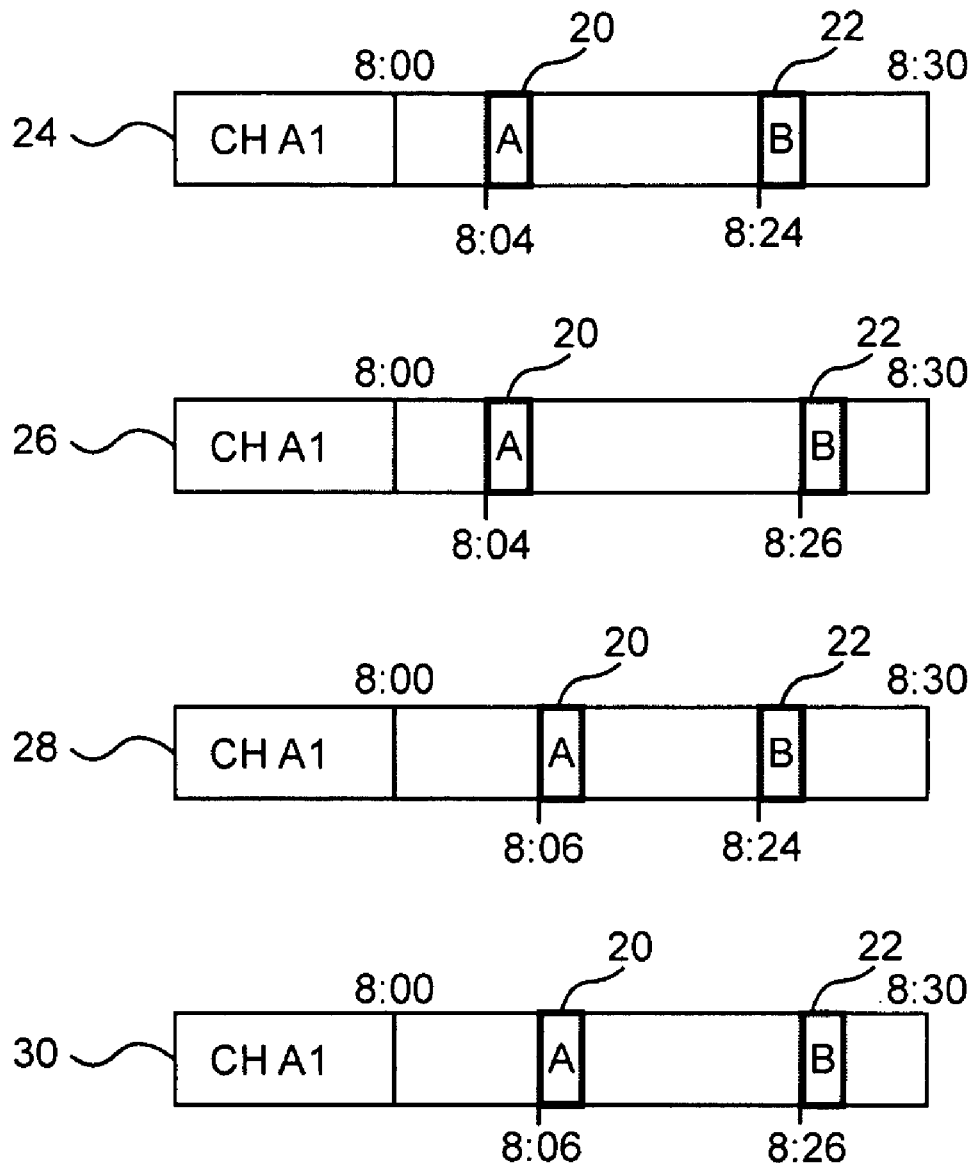
FIG. 3 illustrates channel schedules for a channel with a plurality of different permissible advertising time slots for two advertising breaks according to one embodiment of the invention.

The advertising schedule according to the present invention is selected from a plurality of composite schedules, which are generated from individual channel schedules. FIG. 3 illustrates channel schedules for a channel A1 having a plurality of different permissible advertising time slots for two advertising breaks 20 and 22. It is assumed that permissible advertising time slots are 8:04 PM and 8:06 PM for the first advertising break 20, and 8:24 PM and 8:26 PM for the second advertising break 22. Since there are two permissible time slots for each of the two advertising breaks 20 and 22, there are four different potential channel schedules. A channel schedule 24 has the advertising break 20 scheduled at an 8:04 PM advertising time slot and the advertising break 22 scheduled at an 8:24 PM advertising time slot. A channel schedule 26 has the advertising break 20 scheduled at an 8:04 PM advertising time slot and the advertising break 22 scheduled at an 8:26 PM advertising time slot. A channel schedule 28 has the advertising break 20 scheduled at an 8:06 PM advertising time slot and the advertising break 22 scheduled at an 8:24 PM advertising time slot. A channel schedule 30 has the advertising break 20 scheduled at an 8:06 PM advertising time slot and the advertising break 22 scheduled at an 8:26 PM advertising time slot.

While for purposes of illustration the channel A1 is shown having two potential time slots for the first advertising break 20 and two potential time slots for the second advertising break 22, in practice it may be permissible to have a time slot at anytime between two specific times of day, such as between 8:04 PM and 8:06 PM. Thus, there may be a number of permissible time slots between 8:04 PM and 8:06 PM. The amount of time between two distinct time slots can be implementation dependent. According to one embodiment of the invention, time slots can vary by as little time as one second. In the example illustrated in FIG. 3, if time slots can be offset by one second and advertising time slots can be initiated at anytime between 8:04 PM and 8:06 PM, there are 120 permissible time slots for the advertising break 20, one permissible time slot for each second between 8:04 PM and 8:06 PM. Similarly, if the advertising break 22 can occur at any time between 8:24 PM and 8:26 PM, there would be 120 permissible time slots for the advertising break 22, one permissible time slot for each second between 8:24 PM and 8:26 PM. Consequently, while only four channel schedules are shown in FIG. 3, there may be many channel schedules for each respective channel depending on the number of permissible time slots available.

According to one embodiment of the invention, permissible time slots are created through the use of time scale modification of the programming with which the advertisement will be presented. Time scale modification involves subtly slowing or increasing the speed at which a program is displayed in a manner that is not disruptive to the viewer, as is known to those skilled in the art. According to one embodiment of the invention, time scale modification may be implemented in the user devices 14, enabling advertisement insertion at identified splice points within the respective video stream associated with a program. Time scale modification can be used to alter the originally scheduled time of an advertisement to an earlier or later time. For example, an advertisement may be scheduled on a particular channel to be displayed at 8:04 PM. However, the present invention may determine that through time scale modification, the advertisement can be played on the channel at any time between 8:02:30-8:05:30 PM by imperceptibly speeding up or slowing down the display of the program. With this information for the purposes of generating an advertising schedule, the present invention can generate channel schedules for the channel having permissible time slots between 8:02:30 PM and 8:05:30 PM.

Figure 4:
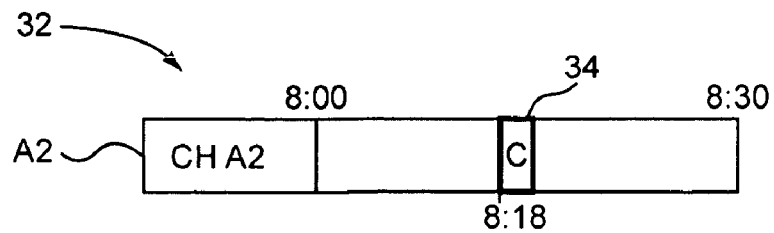
FIG. 4 illustrates a channel schedule according to one embodiment of the present invention.

FIG. 4 illustrates a channel schedule 32 for a channel A2. For purposes of illustration it is assumed that there is only a single advertising break 34 scheduled for the channel A2 and that only one permissible time slot at 8:18 can be assigned to the channel A2. The channel schedule 32 therefore shows the only permissible channel schedule for the channel A2.

Figure 5:
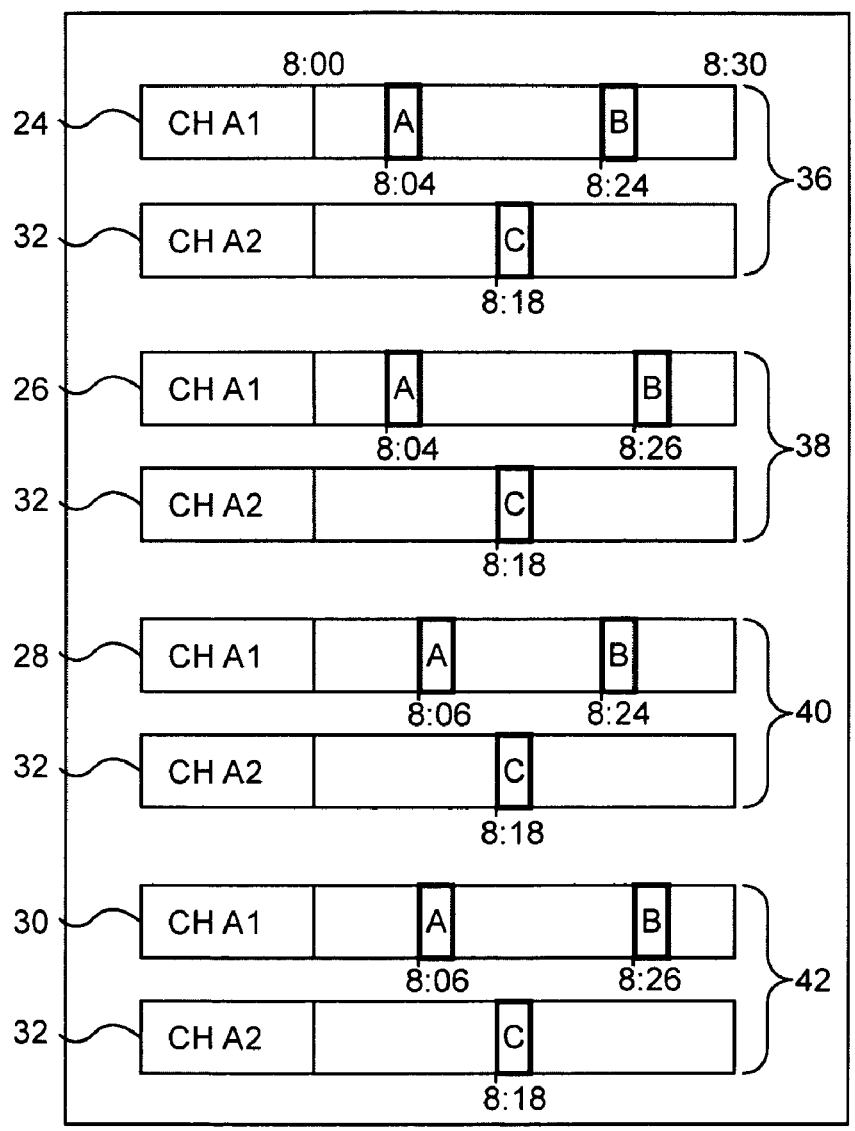
FIG. 5 illustrates four composite schedules according to one embodiment of the invention.

After channel schedules have been generated, the present invention determines a plurality of composite schedules that group the plurality of channel schedules into each possible permutation given the individual channel schedules. FIG. 5 is an illustration of four simplistic composite schedules according to one embodiment of the invention. For purposes of illustration it is assumed that an advertising schedule is being generated for only two channels, the channel A1 shown in FIG. 3 and the channel A2 shown in FIG. 4. Each composite schedule 36, 38, 40, 42 shows a different potential advertising schedule based on the potential channel schedules associated with the channels A1 and A2. It should be apparent to those skilled in the art that in a practical implementation there would be a large number of composite schedules based on all the permutations associated with multiple channel schedules for each of multiple channels.

Figure 6:
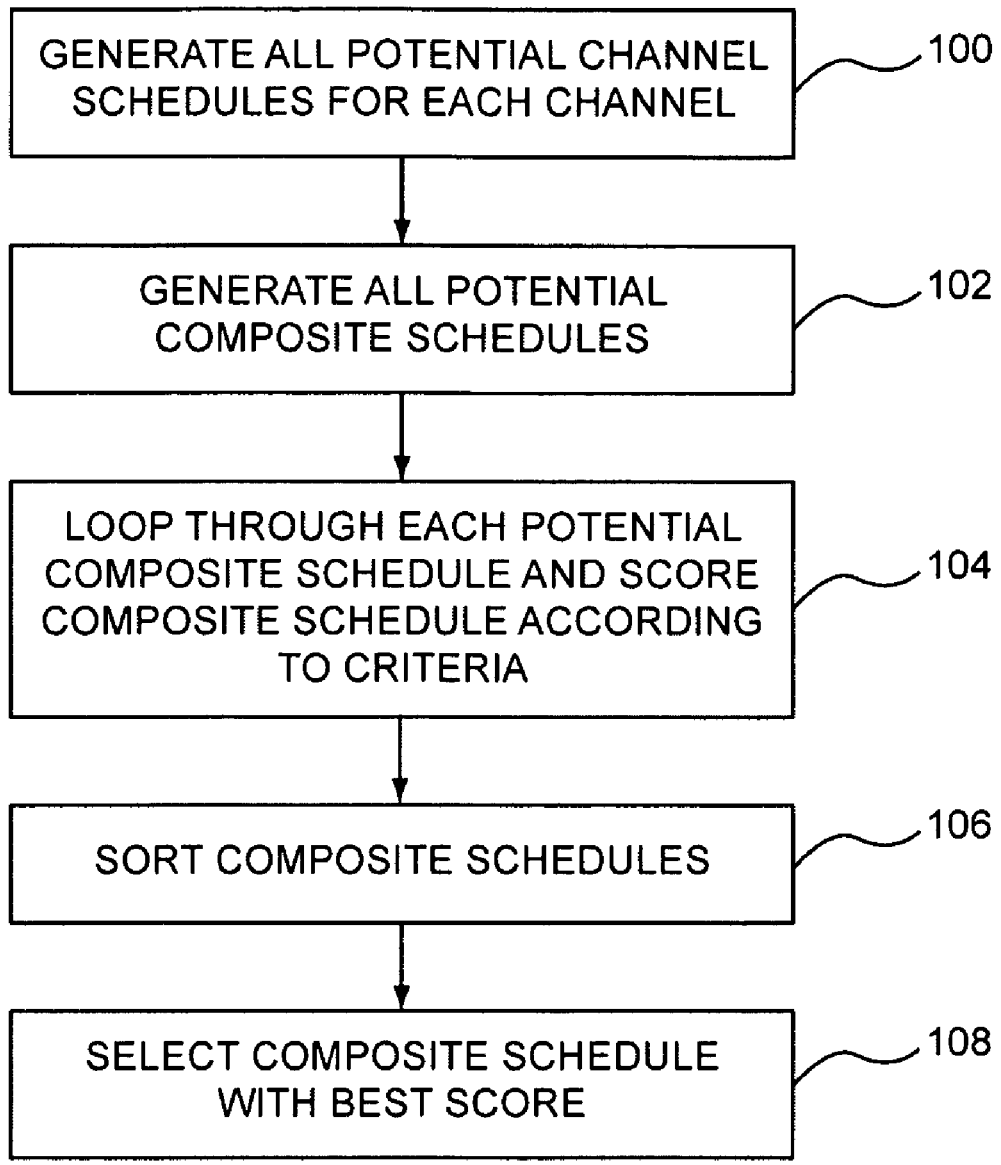
FIG. 6 is a flow chart illustrating a process for generating an advertising schedule according to one embodiment of the invention.

FIG. 6 is a flow chart illustrating a process for generating an advertising schedule according to one embodiment of the invention. First, the channels for which an advertising schedule will be generated are determined. All potential channel schedules for each such channel are generated (step 100). All potential composite schedules are generated based on the various possible permutations for all the channel schedules (step 102). Each potential composite schedule is then scored based on criteria relating to certain characteristics bearing on the likelihood of a respective viewer channel surfing (step 104). The composite scores are then sorted based on the associated score (step 106). The composite schedule with the best score is selected as the advertising schedule (step 108).

Figure 7:
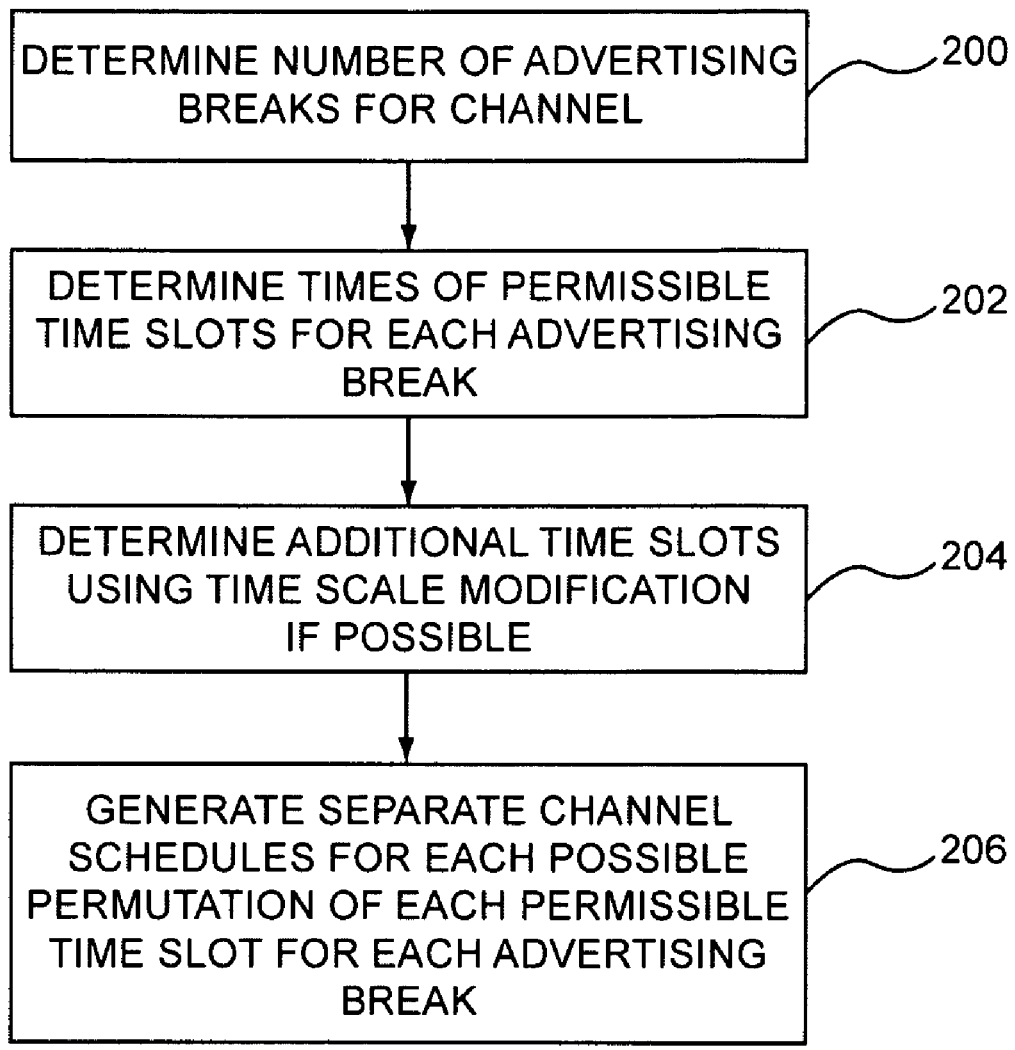
FIG. 7 is a flow chart illustrating a process for generating channel schedules for a channel according to one embodiment of the invention.

FIG. 7 is a flow chart illustrating a process for generating channel schedules for a channel according to one embodiment of the present invention. First, the number of advertising breaks for the channel over the period of time that the advertising schedule will cover is determined (step 200). The permissible time slots for each advertising break is then determined (step 202). If time scale modification can be used, it is determined if additional time slots can be generated via the use of time scale modification (step 204). Separate channel schedules are then generated for each possible permutation of each permissible time slot for each advertising break (step 206). For example, assume that the channel has three advertising breaks and that time scale modification can be used to assign time slots for the first advertising break at any time between 8:06 PM and 8:08 PM, for the second advertising break at any time between 8:28 PM and 8:30 PM, and for the third advertising break at any time between 8:48 PM and 8:50 PM. Further assume that increments between time slots can be one second. Thus, there are 120 possible time slots for the first advertising break, a 120 possible time slots for the second advertising break, and 120 possible time slots for the third advertising break. Given these assumptions, the present invention would generate 1,728,000 channel schedules for the respective channel.

Composite schedules are then generated from the channel schedules generated for each channel as illustrated in FIG. 5. Any mechanism for arranging the channel schedules of each channel into all possible permutations of all channels into a plurality of composite schedules may be used to generate the composite schedules. In one embodiment, a Cartesian product of all potential composite schedules is generated based on all potential channel schedules for each channel that is included in the advertising schedule.

Figure 8:
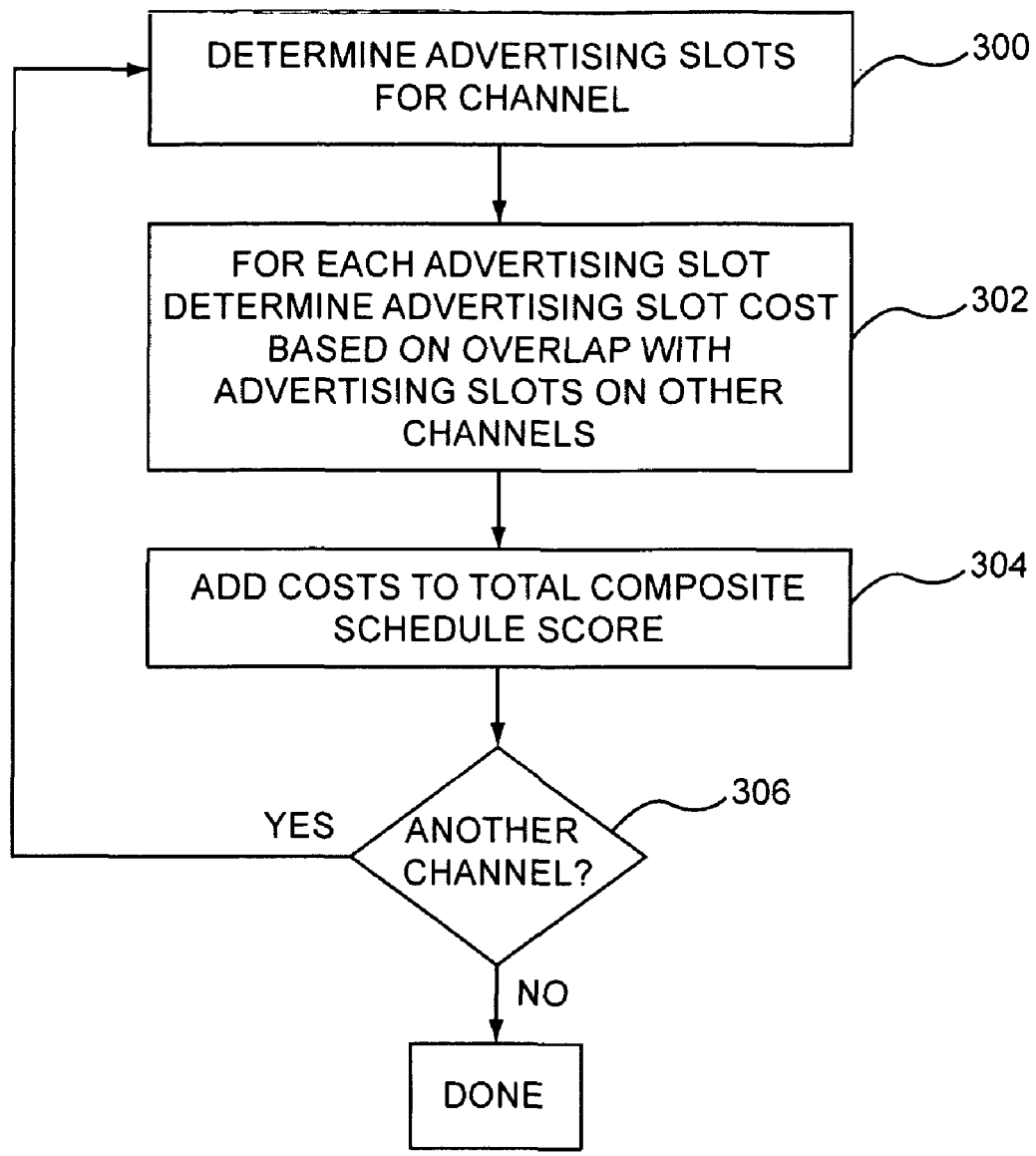
FIG. 8 is a flow diagram illustrating a process for scoring composite schedules according to one embodiment of the invention.

FIG. 8 is a flow diagram illustrating a process for scoring the composite schedules according to one embodiment of the present invention. A first channel in the composite schedule is selected and the number of advertising slots for the selected channel are determined (step 300). For each advertising slot, an advertising slot cost is determined based on the surfing characteristics of viewers predicted to be viewing channels on other channels that overlap with the selected channel (step 302). The advertising slot cost is accumulated in a total composite schedule score (step 304). If there is another channel in the composite schedule (step 306), the process repeats, beginning at step 300; otherwise, the process ends for that composite schedule.

Figure 9:
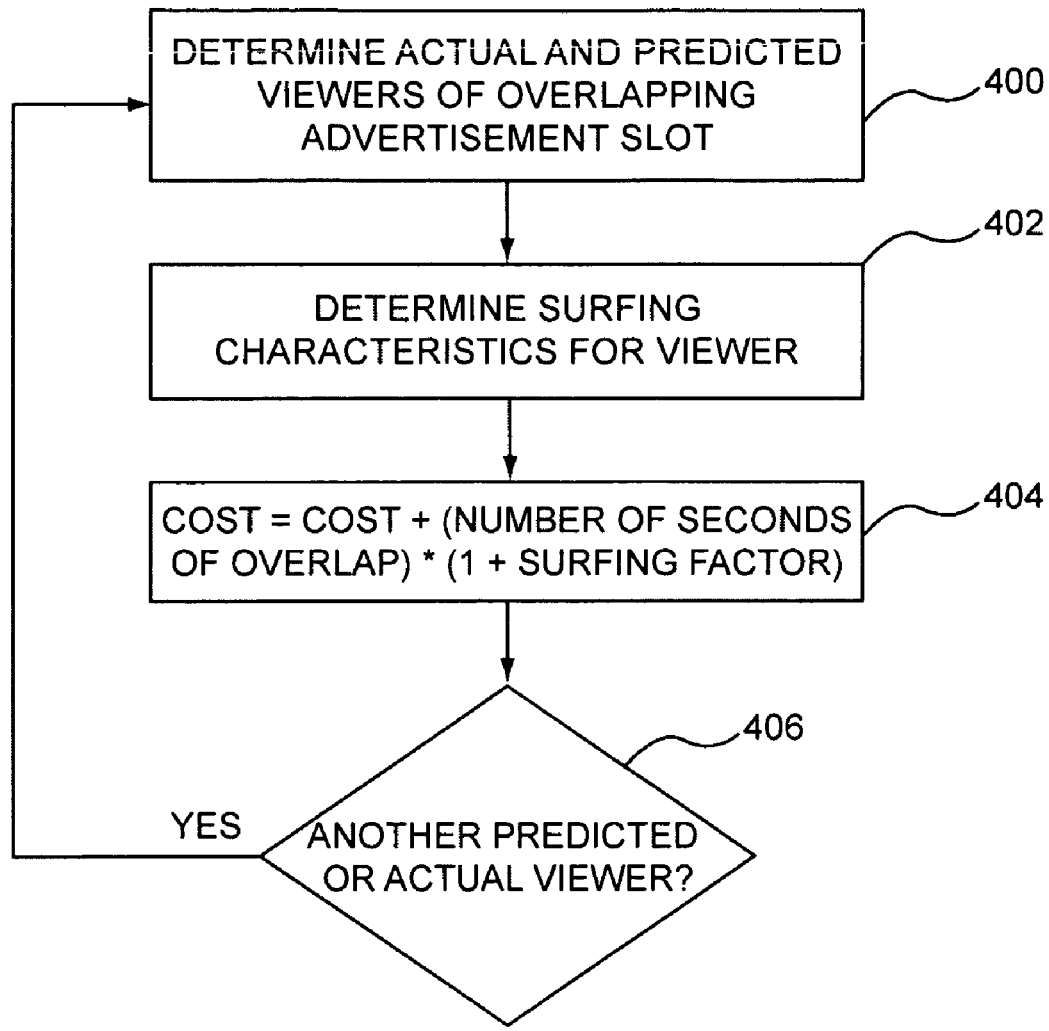
FIG. 9 is a flow diagram illustrating a process for determining an advertising slot cost according to one embodiment of the invention.

FIG. 9 is a flow diagram illustrating a process for determining an advertising slot cost according to one embodiment of the present invention. For purposes of illustration it is assumed that the advertising slot for which an advertising cost is being determined overlaps with at least one other advertising slot on another channel. Actual and predicted viewers of the other channel are determined (step 400). Actual viewers may be determined if the advertising schedule is being generated for the existing programming that is currently being provided over the shared medium 12 by simply determining which user devices 14 are tuned to which particular channels. Predicted viewers can be determined by analyzing viewer profiles that indicate program preferences and data relating to historical consumption of programming content by respective viewers. Predicted viewers may also be determined through analysis of recording schedules for programs from user devices 14 that are capable of recording programs. Surfing characteristics bearing on a likelihood of a respective viewer channel surfing are determined (step 402). As discussed previously, surfing characteristics can be determined from information such as channel change information, a profile associated with the respective viewer, and information relating to the program being provided on the channel. For example, for each predicted or actual viewer, the associated viewer profile and channel change information can be obtained. Information that identifies the respective program can be obtained, and the channel change information can be analyzed to find the viewer's historical surfing characteristics during the same show or similar shows, e.g., cooking shows, adventure movies, and the like. A cost is determined based on the number of seconds of overlap of the channel multiplied by a surfing factor (step 404). For example, assume that the amount of overlap is ten seconds, and the respective viewer channel surfs 20% of the time the viewer is shown an advertisement. The calculation may be 10 (seconds)*(1+0.20 (percentage of time viewer channel surfs))=12. If there are other predicted or actual viewers of the overlapping channel (step 406), the process repeats at step 402.

In this manner, scores based on channel surfing characteristics can be determined for each of the composite scores, and the composite schedule having the lowest score can be selected since the lowest score represents the schedule with the least amount of predicted aggregate simultaneous channel surfers. It should be clear to those skilled in the art that determining a surfing factor based on a percentage of the time a viewer channel surfs is only one way to quantify channel surfing of a viewer and that any suitable manner for quantifying channel surfing based on the channel change information obtained from the user devices 14 can be used in the present invention.

According to one embodiment of the invention, composite scores are based on a likelihood of viewers channel surfing from a low viewership program to a high viewership program. Low viewership programs require the same bandwidth utilization of the shared medium 12 as a high viewership program. Consequently, the shared medium 12 may be loaded to capacity simply because a number of viewers are each watching separate, relatively unpopular channels. If such viewers channel surf to a high viewership program that is already being provided over the shared medium 12, then the bandwidth used by the low viewership program can be de-allocated, assuming no other viewers are viewing the low viewership program. According to one embodiment of the invention, composite schedules that contain advertising slots for popular channels that do not overlap with advertising slots for unpopular channels are scored higher than composite schedules that contain advertising slots for popular channels that do overlap with advertising slots for unpopular channels. Scoring a composite schedule based on overlap of advertising on popular programs versus unpopular programs can be accomplished, for example, by increasing a score of a composite schedule for each occurrence that an advertisement slot of an unpopular program does not overlap an advertisement of a popular program.

According to another embodiment of the invention, viewer destination characteristics bearing on a likelihood of a viewer selecting a particular destination channel are used to arrange advertising slots such that likely destination channels are not on an advertising break while other channels that are likely to be viewed are on an advertising break. Viewer destination characteristics may be determined by analyzing channel surfing information, or predicted by analyzing viewer profile information indicating an interest of the respective viewers. For example, channel surfing information may indicate that viewers of the Golf Channel typically surf to ESPN when the Golf channel is on an advertising break. Composite scores can be calculated such that the cost associated with an advertisement slot is lowered if programs that predicted viewers of that channel favor are not on advertising break at the same time.

Figure 10A:
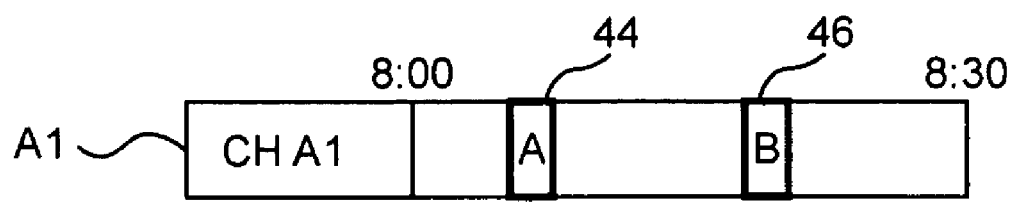
FIG. 10A is a block diagram of a channel carrying a popular program and having two advertisement breaks.
Figure 10B:
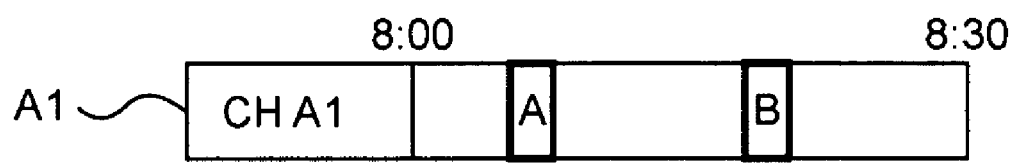
FIG. 10B is a block diagram illustrating the channel shown in FIG. 10A being replicated.
Figure 10B:
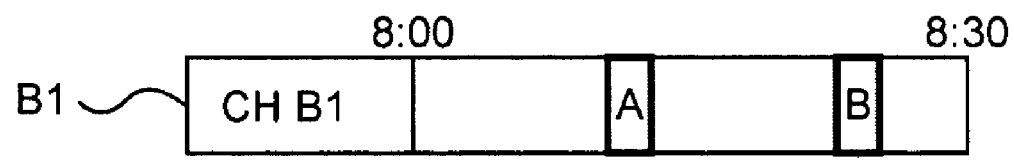

According to another embodiment of the present invention, a channel having a high number of actual or predicted viewers can be duplicated, or replicated, for the purpose of reducing simultaneous channel surfers. FIG. 10A is a block diagram of a channel A1 carrying a popular program and having two advertising breaks 44 and 46, respectively. Assume that the program is a season premiere of a very popular television series. Thus, there is a high likelihood of significant channel surfing during the advertisement breaks 44 and 46. FIG. 10B is a block diagram illustrating the channel A1 and a replicated channel B1. The channel A1 and the replicated channel B1 carry the same programming, but the advertising breaks for each channel have been assigned to different time slots such that the advertising breaks do not overlap. Time scale modification may be used to move the advertising breaks on the replicated channel B1 to different times from that on the channel A1. Channel replication may be initiated by the headend 10 on an as-needed basis and may be transparent to the viewers of the channel. The headend 10 can determine that channel replication is desirable, obtain a new frequency to carry the replicated channel B1, begin providing the replicated channel B1 on the new frequency, select a number of user devices 14 that are currently tuned to the channel A1, and direct the user devices 14 to tune to the new frequency. While channel replication will require additional bandwidth of the shared medium 12 to carry the replicated channel B1, channel surfing may be significantly reduced to an extent that extra usage of bandwidth is a desirable tradeoff for reduced channel surfing.

Figure 11:
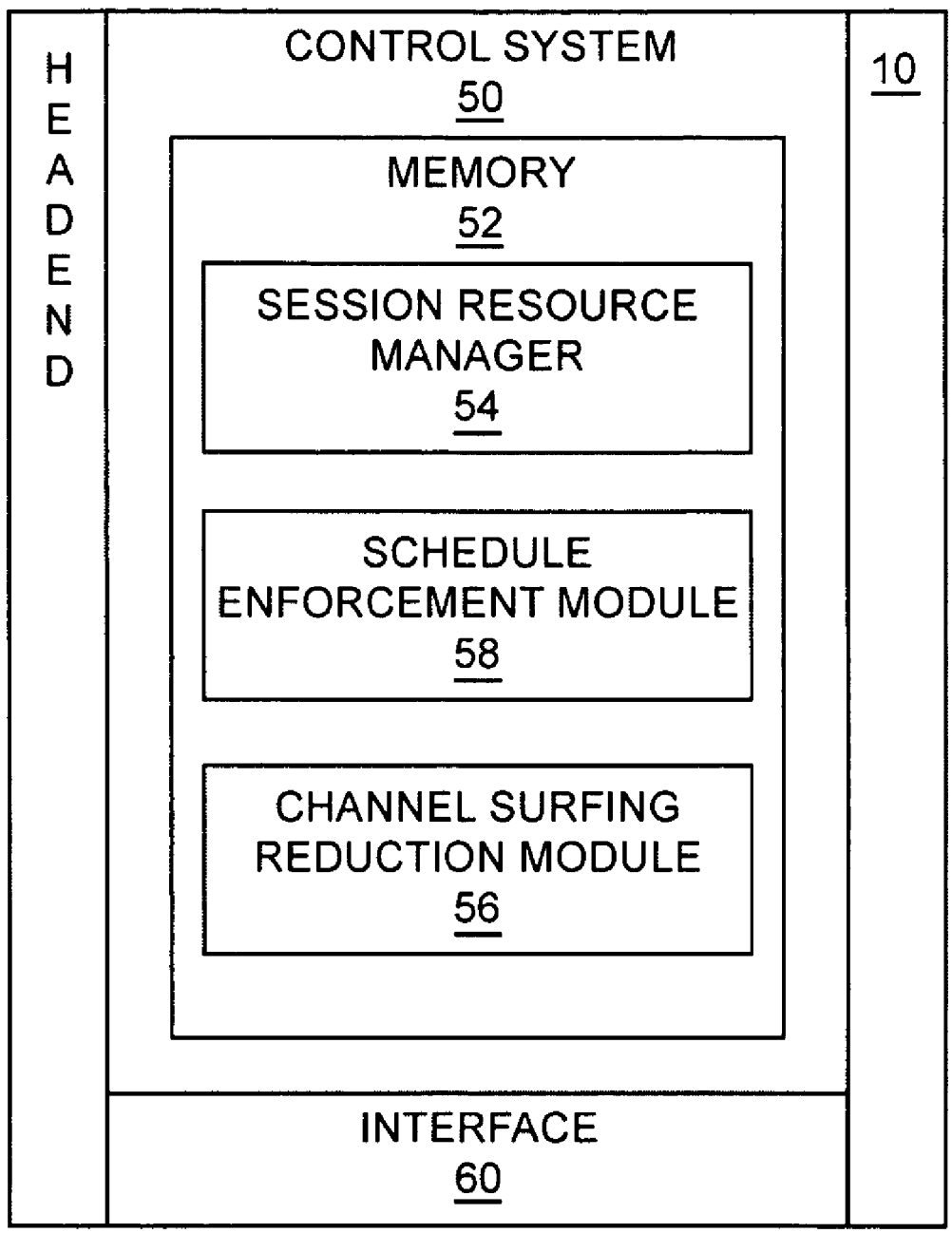
FIG. 11 is a block diagram of a headend according to one embodiment of the invention.

FIG. 11 is a block diagram of a headend 10 according to one embodiment of the present invention. A control system 50 includes a processor (not shown) that executes a conventional or proprietary operating system, such as Unix or Linux. A memory 52 includes software modules executable on the processor and capable of carrying out the functionality described herein. A session resource manager 54 is responsible for managing resources on the headend 10 on a session basis. A channel surfing reduction module 56 is responsible for generating the channel schedules, the composite schedules, and the advertising schedule as described herein. A schedule enforcement module 58 provides an application programming interface (API) (not shown) for other modules or components to control the playback of programs on particular channels. The API may expose channel control management functions such as schedule creation, destruction, and the ability to add or remove advertisement time slots. The schedule enforcement module 58 can employ time scale modification techniques to programs to ensure the advertisement time slots are provided at the appropriate times. The schedule enforcement module 58 preferably communicates with an advertisement server and advertisement slicer (not shown) to insert advertisement cues into the content feed for the channels. Advertisement cues can be used to identify splice points within video streams indicating where an advertisement may be inserted with minimal or no impact to a viewer.

An interface 60 can comprise one or more interfaces to communicate with external devices as appropriate. For example, the interface 60 may include an Ethernet interface to communicate with other devices useful in providing video services, such as a network feed receiver, a video server, quadrature amplitude modulators, and the like. While the headend 10 is illustrated herein as having a particular division of functionality among particular modules, such division of functionality among particular modules is design dependent and the invention is not limited thereto. For example, the functionality of the channel surfing reduction module 56, the schedule enforcement module 58 and the session resource manager 54 can be implemented in a single module, or can be further divided into more than three modules, without departing from the scope of the invention. Moreover, the headend 10 may be a single device, as illustrated in FIG. 11, or may comprise multiple devices communicatively coupled together. Certain functionality may be implemented in software, firmware, an application specific integrated circuit, or the like, as desired.

Those skilled in the art will recognize improvements and modifications to the preferred embodiments of the present invention. All such improvements and modifications are considered within the scope of the concepts disclosed herein and the claims that follow.

What is claimed is:

1. A method for arranging advertising comprising:
   determining, by a processing device, surfing characteristics of a plurality of viewers, the surfing characteristics bearing on a likelihood of a respective viewer channel surfing;
   assigning, by the processing device, some of a plurality of advertisement time slots to first times for a first channel among a plurality of channels that the plurality of viewers is predicted to view based on the surfing characteristics;
   predicting a surfing destination channel for the plurality of viewers based on viewer destination characteristics bearing on a likelihood of a respective viewer selecting a particular destination channel;
   assigning no advertisement time slots to the surfing destination channel during the first times so that no advertisements are presented on the surfing destination channel while advertisements are presented on the first channel during the first times to form an advertising schedule to reduce simultaneous channel surfing during at least one of the plurality of advertisement time slots; and
   delivering programming with a plurality of advertisements according to the advertising schedule.

2. The method of claim 1 wherein the plurality of advertisement time slots is assigned at various times among the plurality of channels in a first arrangement that has an aggregate simultaneous surfing characteristic that is less than an aggregate simultaneous surfing characteristic of another arrangement.

3. The method of claim 2 wherein assigning the plurality of advertisement time slots at the various times among the plurality of channels based on the surfing characteristics of the plurality of viewers to form the advertising schedule further comprises assigning the plurality of advertisement time slots at the various times among the plurality of channels based on current channel viewership and the surfing characteristics of the plurality of viewers to form the advertising schedule.

4. The method of claim 1 wherein the plurality of advertisement time slots is assigned at various times among the plurality of channels in a first arrangement that has an aggregate simultaneous surfing characteristic across the plurality of channels that is less than an aggregate simultaneous surfing characteristic of any other arrangement.

5. The method of claim 1 wherein at least some of the plurality of advertisement time slots is assigned to a first group of programs at first times and no advertisement time slots are assigned to a second group of programs at the first times.

6. The method of claim 5 wherein the first group of programs comprises programs that are determined to be low viewership programs, and the second group of programs comprises programs that are determined to be high viewership programs.

7. The method of claim 1 further comprising:
   establishing a replicated channel of the first channel currently being delivered to the plurality of viewers;
   effecting transfer of a plurality of the plurality of viewers from the first channel to the replicated channel;
   assigning some of the plurality of advertisement time slots to first times in the first channel; and
   assigning others of the plurality of advertisement time slots to second times in the replicated channel, wherein the first times are different from the second times such that advertisements are not provided on the first channel at a same time that advertisements are provided on the replicated channel.

8. The method of claim 1 wherein determining the surfing characteristics of the plurality of viewers comprises identifying channel change requests associated with the plurality of viewers over a first period of time, and identifying, for each of the channel change requests:
   a channel from which the respective viewer is channel surfing;
   a program associated with the channel at a time of the channel change request; and
   whether an advertisement was playing on the channel at the time of the channel change request.

9. The method of claim 1 wherein a start time associated with at least one of the advertisement time slots is created based on adjusting a playback speed of a program with which the at least one of the advertisement time slots is associated.

10. An apparatus for arranging advertising comprising:
    a communications interface adapted to communicate with a network;
    a control system coupled to the communications interface and adapted to:
    determine surfing characteristics of a plurality of viewers, the surfing characteristics bearing on a likelihood of a respective viewer channel surfing;
    assign some of a plurality of advertisement time slots to first times for a first channel among a plurality of channels that the plurality of viewers is predicted to view based on the surfing characteristics;
    predict a surfing destination channel for the plurality of viewers based on viewer destination characteristics bearing on a likelihood of a respective viewer selecting a particular destination channel;
    assign no advertisement time slots to the surfing destination channel during the first times so that no advertisements are presented on the surfing destination channel while advertisements are presented on the first channel during the first times to form an advertising schedule to reduce simultaneous channel surfing during at least one of the plurality of advertisement time slots; and
    effect delivery of programming with a plurality of advertisements according to the advertising schedule.

11. The apparatus of claim 10 wherein the plurality of advertisement time slots is assigned at various times among the plurality of channels in a first arrangement that has an aggregate simultaneous surfing characteristic across the plurality of channels that is less than an aggregate simultaneous surfing characteristic of any other arrangement.

12. The apparatus of claim 11 wherein to assign the plurality of advertisement time slots at the various times among the plurality of channels based on the surfing characteristics of the plurality of viewers to form the advertising schedule, the control system is further adapted to assign the plurality of advertisement time slots at the various times among the plurality of channels based on current channel viewership and the surfing characteristics of the plurality of viewers to form the advertising schedule.

13. The apparatus of claim 10 wherein at least some of the plurality of advertisement time slots is assigned to a first group of programs at first times and no advertisement time slots are assigned to a second group of programs at the first times.

14. The apparatus of claim 10 wherein the control system is further adapted to:
 establish a replicated channel of the first channel currently being delivered to the plurality of viewers;
 effect transfer of a plurality of the plurality of viewers from the first channel to the replicated channel;
 assign some of the plurality of advertisement time slots to first times in the first channel; and
 assign others of the plurality of advertisement time slots to second times in the replicated channel, wherein the first times are different from the second times such that advertisements are not provided on the first channel at a same time that advertisements are provided on the replicated channel.

15. The apparatus of claim 10 wherein a start time associated with at least one of the advertisement time slots is created based on adjusting a playback speed of a program with which the at least one of the advertisement time slots is associated.

16. A method for arranging advertising comprising:
 determining, by a processing device, surfing characteristics of a plurality of viewers, the surfing characteristics bearing on a likelihood of a respective viewer channel surfing;
 assigning, by the processing device, a plurality of advertisement time slots at various times among a plurality of channels based on the surfing characteristics of the plurality of viewers to form an advertising schedule to reduce simultaneous channel surfing during at least one of the plurality of advertisement time slots;
 establishing a replicated channel of a first channel currently being delivered to the plurality of viewers;
 effecting transfer of a plurality of the plurality of viewers from the first channel to the replicated channel;
 assigning some of the plurality of advertisement time slots to first times in the first channel;
 assigning others of the plurality of advertisement time slots to second times in the replicated channel, wherein the first times are different from the second times such that advertisements are not provided on the first channel at a same time that advertisements are provided on the replicated channel; and
 delivering programming with a plurality of advertisements according to the advertising schedule.

* * * * *